United States Patent [19]

Matsuda

[11] Patent Number: 5,793,844
[45] Date of Patent: Aug. 11, 1998

[54] TELEPHONE HAVING AN ANSWERING MACHINE

[75] Inventor: Toshihiro Matsuda, Yamatokoriyama, Japan

[73] Assignee: Sharp Kabushiki Kaisha, Osaka, Japan

[21] Appl. No.: 623,814

[22] Filed: Mar. 29, 1996

[30] Foreign Application Priority Data

Mar. 31, 1995 [JP] Japan .................... 7-075505

[51] Int. Cl.⁶ ........................................... H04M 1/64
[52] U.S. Cl. ............... 379/79; 379/73; 379/100.08; 379/372; 379/421
[58] Field of Search ........................ 379/67, 70, 73, 379/74, 77, 79, 81, 82, 88, 89, 100.08, 102.01, 102.02, 102.03, 102.07, 106.01, 159, 164, 165, 170, 350, 372, 377, 387, 390, 395, 421

[56] References Cited

U.S. PATENT DOCUMENTS

| | | | |
|---|---|---|---|
| 4,847,889 | 7/1989 | Eswaran | 379/67 |
| 4,860,340 | 8/1989 | Suzuki et al. | 379/74 |
| 4,891,834 | 1/1990 | Sezaki et al. | 379/67 |
| 4,998,272 | 3/1991 | Hawkins, Jr. et al. | 379/88 |
| 5,111,500 | 5/1992 | Ashfar et al. | 379/67 |
| 5,400,393 | 3/1995 | Knuth et al. | 379/88 |
| 5,475,739 | 12/1995 | Norimatsu | 379/88 |
| 5,604,791 | 2/1997 | Lee | 379/67 |
| 5,623,537 | 4/1997 | Ensor et al. | 379/67 |

FOREIGN PATENT DOCUMENTS 06046128  2/1994  Japan.

OTHER PUBLICATIONS

JPOABS Abstract corresponding to Yoshino JA #06-046, 128. Feb. 1994.

*Primary Examiner*—Krista Zele
*Assistant Examiner*—Scott L. Weaver

[57] ABSTRACT

A telephone having an answering function includes a receiving section for receiving a voice signal, a command signal, and a receiving signal from a telephone line, and providing the voice signal, the command signal, and the receiving signal as respective outputs; a sending section for sending a response message to the telephone line in response to the receiving signal; a storing section for storing the voice signal provided by the receiving section; a determining section for determining a time period during which the response message is sent to the telephone line; a judging section for judging whether the command signal provided by the receiving section is a predetermined command signal during the time period and generating a judging signal which indicates that the command signal is the predetermined command signal; an output section for converting the voice signal provided by the receiving section into a voice and for outputting the voice; and a prohibiting section for prohibiting the voice signal from being provided to the output section based on the judging signal.

13 Claims, 10 Drawing Sheets

FIG. 4

| Message No. | Message |
|---|---|
| 1 | I'm sorry, I'm not available now. |
| 2 | Please call me later. |
| 3 | If you use the fax, please send now. |
| 4 | If you use the phone, |
| 5 | Leave your name and message at the tone. |
| 6 | Please hold. |
| 7 | A message is now being recorded in the mail box. |
| 8 | Select a mail box number and press the pound key. |
| 9 | We are out of paper. |

FIG.5

| Response message No. | Operating condition | Number of receiving signals | Message |
|---|---|---|---|
| A | Message recording: OK; fax: OK | Set by the user from 1 through 25 | Leave your name and message at the tone. If you use the fax, please send now. |
| B | Message recording: OK; fax: NOT OK | Set by the user from 1 through 25 | I'm sorry, I'm not available now. Leave your name and message at the tone. |
| C | Message recording: NOT OK; fax: OK | Set by the user from 1 through 25 | I'm sorry, I'm not available now. If you use the fax, please send now. If you use the phone, please call me later. |
| D | Message recording: NOT OK; fax: NOT OK | 25 | I'm sorry, I'm not available now. Please call me later. |

FIG.10

| Mail box No. | ID number | | | | Name | | | | | Voice data |
|---|---|---|---|---|---|---|---|---|---|---|
| 01 | 1 | 2 | 3 | 4 | P | A | P | E | R | ......... |
| 02 | 2 | 3 | 4 | 5 | S | H | A | R | P | ......... |
| 03 | 3 | 4 | 5 | 6 | M | E | | | | ......... |
| 04 | 4 | 5 | 6 | 7 | D | A | D | | | ......... |

FIG.11

| N | O | W | | R | E | S | P | O | N | D | I | N | G | | | |
|---|---|---|---|---|---|---|---|---|---|---|---|---|---|---|---|---|
| M | A | I | L | | B | O | X | = | M | E | | | | | | |

FIG.12

| M | A | I | L | | B | O | X | = | M | E | | | | | | |
|---|---|---|---|---|---|---|---|---|---|---|---|---|---|---|---|---|
| I | D | | N | U | M | B | E | R | = | * | * | * | * | | | | ific
TELEPHONE HAVING AN ANSWERING MACHINE

BACKGROUND OF THE INVENTION

1. Field of the Invention

The present invention relates to a telephone having an answering function.

2. Description of the Related Art

A conventional telephone having an answering function operates in the following manner.

The user sets the telephone to an answering mode. In the answering mode, the telephone, for example, sends the caller a prerecorded message and records a message from the caller. Generally, the telephone is set to the answering mode when the user is not present where the telephone is located.

When the telephone is set to the answering mode and a line controller of the telephone receives a receiving signal through a telephone line, the telephone can receive a voice signal and the like and send out a prerecorded message to the telephone line. If the caller leaves a message after the prerecorded message is sent out, the telephone records the voice of the caller onto a recording medium such as a magnetic tape or a semiconductor memory.

In such a conventional telephone having an answering function, a voice signal representing a message from the caller received through the telephone line is output through an audio speaker of the telephone while being recorded onto a recording medium. Accordingly, anybody who is present near the telephone can hear the message.

In order to prevent such an inconvenience, Japanese Laid-Open Patent Publication No. 6-46128, for example, discloses a telephone having an answering function which includes semiconductor memory having a plurality of memory areas.

In the telephone disclosed in the above-mentioned publication, each of the plurality of memory areas is used as a mail box for storing a message. In detail, the user inputs an identification number to a mail box in advance. Guided by a prerecorded response message, the caller inputs a mail box number for storing the message in the mail box. The message stored in the mail box is reproduced only by inputting a predetermined identification number corresponding to the mail box. Thus, a person who does not know the identification number is prohibited from listening to the message. Thus, the confidentiality of the message is guaranteed. However, when a handset of the telephone is picked up while the message is being recorded, the recording is stopped and the person who picked up the handset can start a conversation with the caller. The recording of the message is undesirably stopped, and further the confidentiality of the message is broken.

SUMMARY OF THE INVENTION

A telephone having an answering function according to the present invention includes a receiving section for receiving a voice signal, a command signal, and a receiving signal from a telephone line, and providing the voice signal, the command signal, and the receiving signal as respective outputs; a sending section for sending a response message to the telephone line in response to the receiving signal; a storing section for storing the voice signal provided by the receiving section; a determining section for determining a time period during which the response message is sent to the telephone line; a judging section for judging whether the command signal provided by the receiving section is a predetermined command signal during the time period and generating a judging signal which indicates that the command signal is the predetermined command signal; an output section for converting the voice signal provided by the receiving section into a voice and for outputting the voice; and a prohibiting section for prohibiting the voice signal from being provided to the outputting section based on the judging signal.

In one embodiment of the invention, the outputting section is a handset, and the handset includes a speaker.

In one embodiment of the invention, the outputting section is a speaker.

In one embodiment of the invention, the storing section includes a plurality of storing areas. The answering machine further includes a selection section for selecting a storing area to which the voice signal is to be stored from among the plurality of storing areas.

In one embodiment of the invention, the storing section stores the voice signal into the selected storing area.

In one embodiment of the invention, the telephone further includes a notification section for outputting a prohibition notification signal which indicates that the prohibiting section is prohibiting the voice signal from being provided to the output section.

In one embodiment of the invention, the telephone further includes an input section for receiving data which is input by an operator, wherein the notification section includes a memory for storing the prohibition notification signal therein, and a reading section for reading the prohibition notification signal in accordance with the data which is received by the input section from the memory.

In one embodiment of the invention, the telephone further includes an input section for receiving an identification number which is input by an operator; an identification number memory section for storing a predetermined identification number therein; and a comparison section for comparing the identification number received by the input section and the predetermined identification number stored in the identification number memory section. When the identification number and the predetermined identification number match, the prohibiting section permits the voice signal to be provided to the output section.

In one embodiment of the invention, the command signal is a DTMF signal.

According to the present invention, when a recording area in which the message is to be stored is selected by the caller, the message is prohibited from being output from the speaker of the telephone. Thus, the confidentiality of the message is guaranteed against an unauthorized person.

Further according to the present invention, even if the handset of the telephone is picked up while the message is being recorded, the confidential recording of the message continues until an identification number corresponding to the selected recording area or a termination signal is received. Thus, undesirable termination of the message recording and intervention by an unauthorized person are prevented. Moreover, a communication path is not routed between the handset and the caller unless the identification number corresponding to the selected recording area is input from the receiving end. Accordingly, the message is kept confidential.

Thus, the invention described herein makes possible the advantage of providing a telephone having an answering function for storing a message from a caller in a predetermined mail box while guaranteeing the confidentiality of the message.

3

These and other advantages of the present invention will become apparent to those skilled in the art upon reading and understanding the following detailed description with reference to the accompanying figures.

BRIEF DESCRIPTION OF THE DRAWINGS

FIG. 4 is a table showing exemplary messages stored in the telephone shown in FIG. 3;

FIG. 5 is a table showing exemplary response messages to be sent out of the telephone shown in FIG. 3;

FIG. 10 is a table showing examples of data stored in a mail box of the telephone shown in FIG. 3;

FIG. 11 is a view showing an example of a display which is shown while a message is being recorded into a mail box of the telephone shown in FIG. 3; and FIG. 12 is a view showing an example of a display of the telephone shown in FIG. 3, requesting input of an identification number.

DESCRIPTION OF THE PREFERRED EMBODIMENTS

Hereinafter, the present invention will be described by way of illustrative examples with reference to the accompanying drawings.

EXAMPLE 1

A telephone having an answering function in a first example according to the present invention will be described with reference to FIG. 1.

Figure 1:
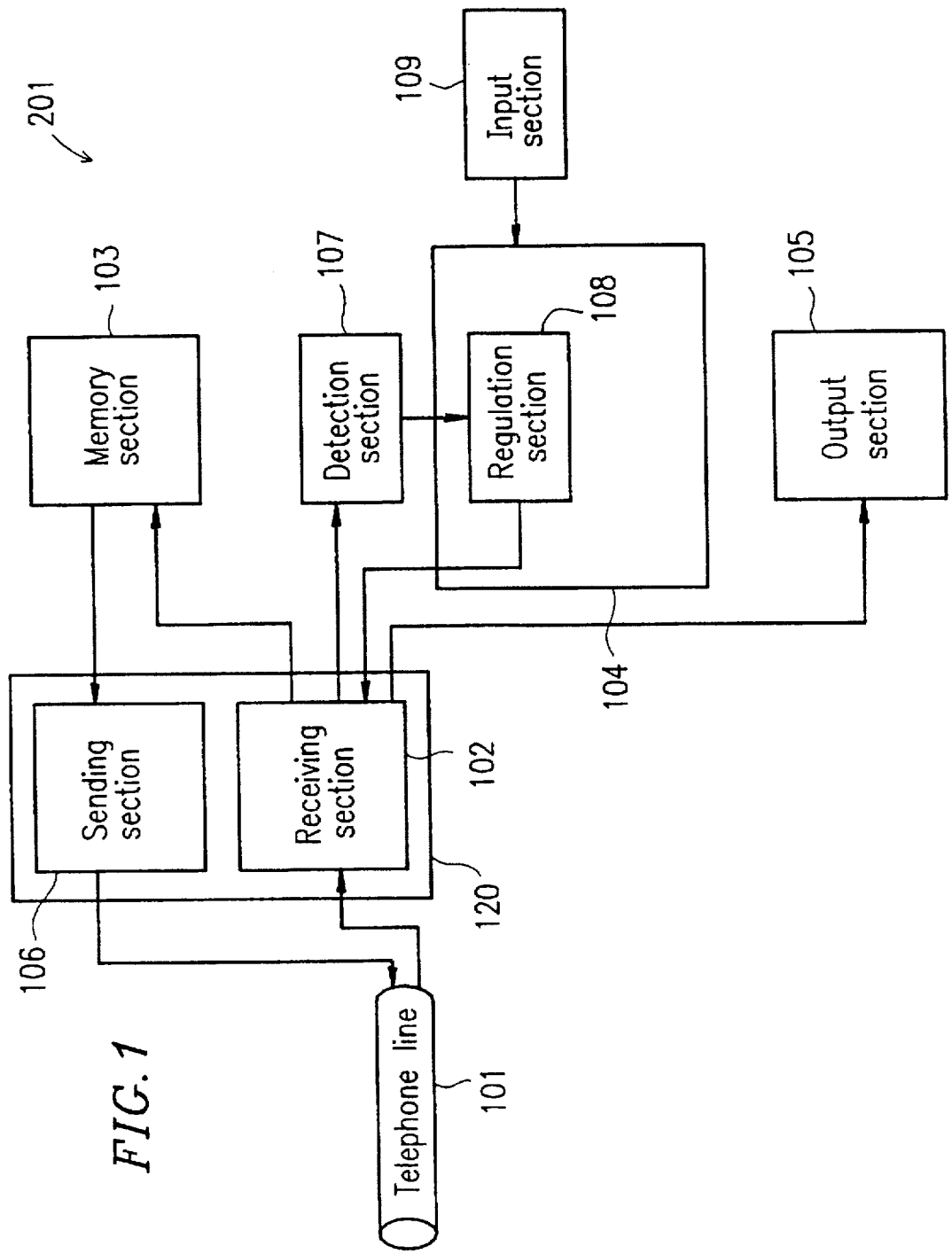
FIG. 1 is a block diagram of a telephone having an answering function in a first example according to the present invention.

FIG. 1 is a block diagram illustrating a telephone 201 having an answering function in the first example. As is shown in FIG. 1, the telephone 201 includes a communication section 120, a memory section 103 for storing a voice signal or the like, a control section 104 including a regulation section 108, an output section 105 for converting a voice signal or the like to a voice and outputting the voice from the telephone 201, and a detection section 107 for detecting a receiving signal and a DTMF signal acting as a command signal. The communication section 120 includes a receiving section 102 and a sending section 106. The receiving section 102 receives a receiving signal, a termination signal indicating that the telephone 201 is disconnected from the telephone line, a DTMF signal, a voice signal representing a voice of the caller, and the like through a telephone line 101 which is connected to another party through a switchboard (not shown). The sending section 106 sends a voice signal representing a voice of the user and a voice signal or a message signal stored in the memory section 103 to the telephone line 101. The control section 104 can include the detection section 107. The telephone 201 can further include an input section 109 for setting the telephone 201 to an answering mode. In such a case, the input section 109 is connected to the control section 104.

The communication section 120 is connected to the memory section 103, the control section 104, the output section 105, and the detection section 107. Thus, the receiving section 102 in the communication section 120 can send the signal from the telephone line 101 to the memory section 103, the control section 104, the output section 105, and the detection section 107. The sending section 106 receives a signal from the memory section 103 and sends the signal to the telephone line 101.

The detection section 107 detects whether or not a signal received by the receiving section 102 includes a predetermined DTMF signal. If the predetermined DTMF signal is included, the detection section 107 informs the regulation section 108 of such detection.

Upon receipt of such information, the regulation section 108 cuts off the connection between the receiving section 102 and the output section 105 in order to prohibit the receiving section 102 from outputting a voice signal sent in through the telephone line 101 to the output section 105.

Hereinafter, an example of the operation of the telephone 201 will be described.

The telephone 201 is set to the answering mode by the user through the input section 109. In the answering mode, the telephone 201 sends a predetermined response message to the caller and, if necessary, records a message from the caller. In the case where the telephone. 201 does not include the input section 109, the telephone 201 can be set to the answering mode in advance.

The telephone 201 set to the answering mode operates in the following manner when a telephone call is made.

When the receiving section 102 receives a receiving signal, the telephone 201 is automatically connected to the telephone line 101 to send or receive a signal to or from the telephone line 101. Then, a response message stored in the memory section 103 is sent to the telephone line 101 by the sending section 106. The response message can be stored at the time of production of the telephone 201 or recorded by the user.

Guided by the response message, the caller can leave a message in the memory section 103. In detail, a voice signal representing the voice of the caller is stored in the following manner. The telephone 201 can be structured so that only the message from the caller is stored or so that the response message and the message from the caller are both recorded.

Based on the recorded response message, the communication section 120 determines a response message period and outputs a signal indicating the response message period to the detection section 107. Thus, while the response message is being sent out, namely, during the response message period, the detection section 107 detects whether or not a signal from the telephone line 101 includes a predetermined DTMF signal. If the predetermined DTMF signal is detected, the regulation section 108 is informed of such detection by the detection section 107. Then, the regulation section 108 cuts off the connection between the receiving section 102 and the output section 105 to prohibit the voice signal from the caller from being output to the output section 105. When the output of the response message to the telephone line is completed, the communication section 120 outputs a signal to the detection section 107, in response to which the detection section 107 stops detection of the DTMF signal.

By such operation, when a signal sent in through the telephone line 101 includes a predetermined DTMF signal.

the voice of the caller is not output from the telephone 201 through the output section 105. The detection section 107 can be structured to supply the regulation section 108 with only the information that the predetermined DTMF signal is detected, or to supply the information on whether or not the predetermined DTMF signal is detected while the response message is being sent out.

When the receiving section 102 receives a termination signal through the telephone line 101, the memory section 103 stops recording. Alternatively, the memory section 103 can be structured to stop recording when a predetermined time period has passed.

Next, the communication section 120 is disconnected from the telephone line 101. Thus, one cycle of operation of the telephone 201 in the answering mode is completed.

Due to the function of the regulation section 108, the voice of the caller leaving a message is prohibited from being output through the handset or the speaker of the telephone 201. Thus, the message can be kept confidential.

EXAMPLE 2

A telephone having an answering function in a second example according to the present invention will be described with reference to FIG. 2.

Figure 2:
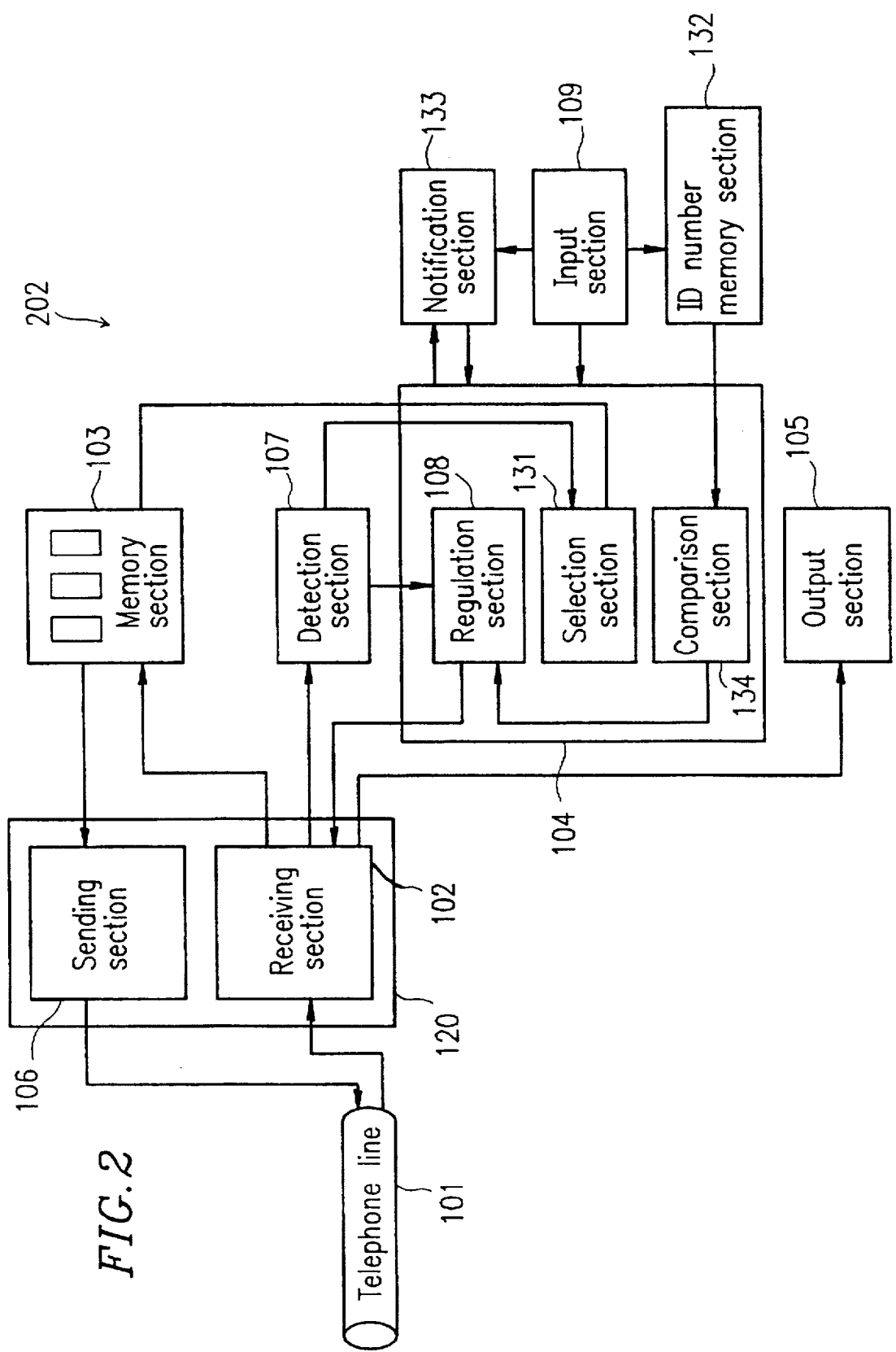
FIG. 2 is a block diagram of a telephone having an answering function in a second example according to the present invention.

FIG. 2 is a block diagram illustrating a telephone 202 having an answering function in this example. Identical elements as those in the first example will bear identical reference numerals therewith and the descriptions thereof will be omitted. As is shown in FIG. 2, the telephone 202 includes an identification number memory section 132 for storing an identification number and a notification section 133 for outputting, for example, data which is input from the input section 109, in addition to the structure of the telephone 201 described in the first example. The control section 104 includes a selection section 131 and a comparison section 134 in addition to the regulation section 108. In this example, the output section 105 outputs information visually as well as audibly.

The memory section 103 includes a plurality of mail boxes. The caller can select a desired mail box from among the plurality of mail boxes using a DTMF signal and record a message into the selected mail box. A DTMF signal indicates the numerical figure representative of a desired mail box. Since a DTMF signal is used for selecting a mail box, a quantity of DTMF signals equal to the quantity of mail boxes is preferably provided. In the case where a smaller quantity of DTMF signals is provided, only the quantity of mail boxes equal to the DTMF signals can be used. The user can read a voice signal representing the caller's message from the mail box by inputting an identification number allocated for the selected mail box. When the correct identification number is input, the message is output from the telephone 202 through the output section 105.

An example of the operation of the telephone 202 will be described.

The telephone 202 is set to the answering mode by the user through the input section 109. In the case where the telephone 202 does not include the input section 109, the telephone 202 can be set to the answering mode in advance.

The telephone 202 set to the answering mode operates in the following manner when a telephone call is made.

When the receiving section 102 receives a receiving signal, the telephone 202 is automatically connected to the telephone line 101. Thus, the telephone 202 is enabled to send a signal to the telephone line 101 and/or receive a signal from the telephone line 101. Then, a response message stored in the memory section 103 is sent to the telephone line 101 by the sending section 106. The response message can be stored at the time of production of the telephone 202 or recorded by the user.

Guided by the response message, the caller can leave a message in the memory section 103. In detail, a voice signal representing the voice of the caller is stored in the following manner. Based on the recorded response message, the communication section 120 determines a response message period and outputs a signal indicating the response message period to the detection section 107. Thus, while the response message is being sent out by the sending section 106, namely, during the response message period, the detection section 107 detects whether or not a signal sent through the telephone line 101 includes a predetermined DTMF signal. When the predetermined DTMF signal is detected, the detection section 107 sends the detected DTMF signal to the selection section 131 and the regulation section 108. When the output of the response message to the telephone line is completed, the communication section 120 outputs a signal to the detection section 107, in response to which the detection section 107 stops detection of the DTMF signal. The selection section 131 selects a mail box corresponding to the detected DTMF signal from among the plurality of mail boxes. The control section 104 including the selection section 131 outputs a signal representing the selected mail box to the notification section 133. In the case where the notification section 133 is a display, the notification section 133 displays, for example, the name of the selected mail box based on the signal received from the control section 104.

Then, the control section 104 supplies the communication section 120 with a determination signal which is used by the communication section 120 to select a mail box to which a voice signal from the caller is to be sent. In accordance with the determination signal, the communication section 120 outputs the voice signal to the selected mail box. Thus, the voice signal is stored in the selected mail box.

The regulation section 108 prohibits the communication section 120 from outputting the voice signal to the output section 105. Such an operation state is displayed by the notification section 133 based on the signal from the control section 104. By such an operation, the message from the caller is not overheard while being recorded.

While the communication section 120 is being prohibited from outputting the voice signal, the output section 105 displays, for example by the notification section 133, a request for input of the identification number corresponding to the selected mail box. The user inputs the identification number through the input section 109 in accordance with the display of the notification section 133, and the identification number is sent to the control section 104. The comparison section 134 compares the identification number input by the user and the identification number stored in advance in correspondence with the selected mail box. If the two identification numbers match, the regulation section 108 cancels the prohibition and permits the voice signal to be sent to the output section 105. Thus, the user can listen to the message from the caller.

EXAMPLE 3

A telephone having an answering function in a third example according to the present invention will be described with reference to FIG. 3.

Figure 3:
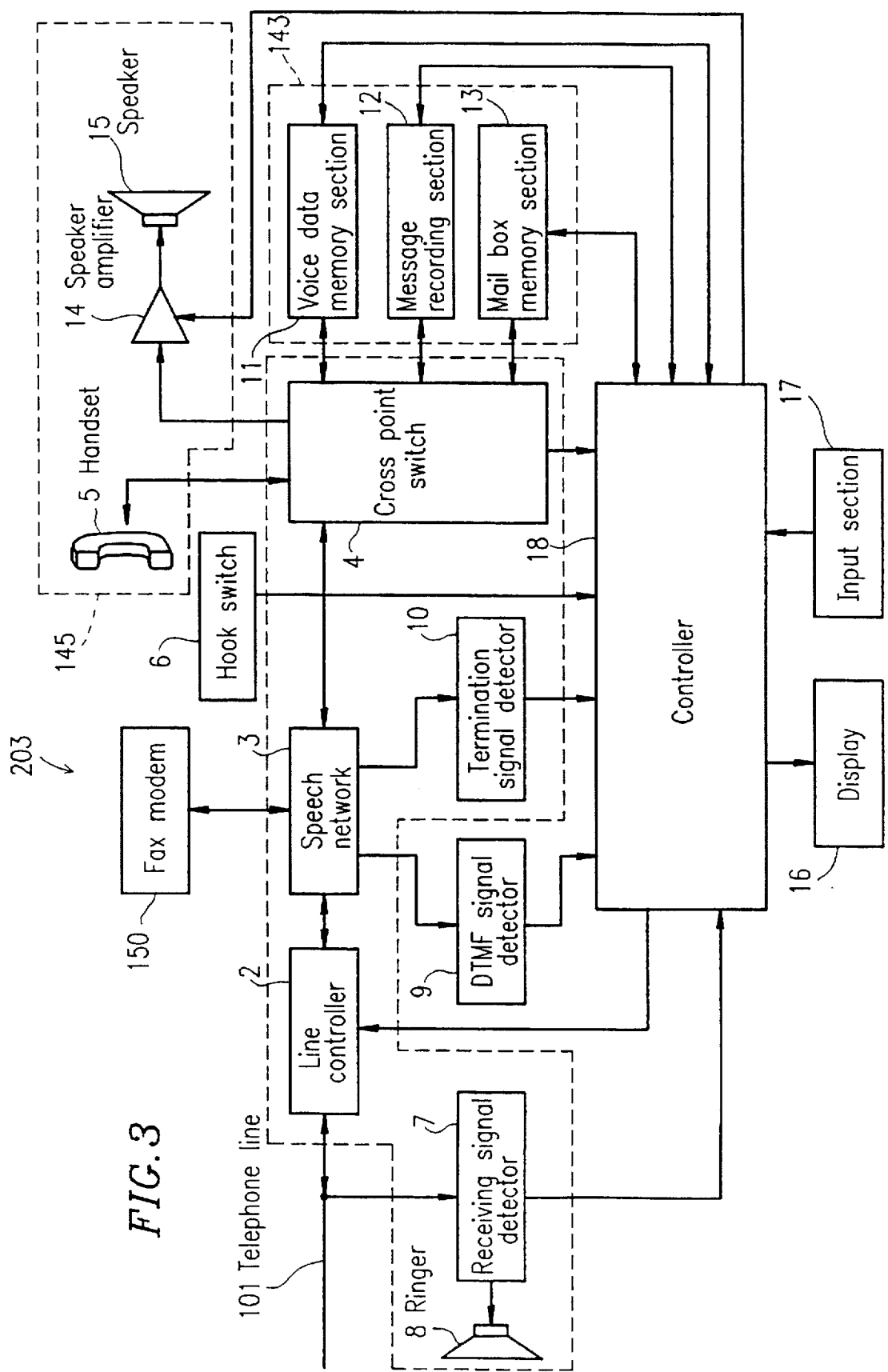
FIG. 3 is a block diagram of a telephone having an answering function in a third example according to the present invention.

FIG. 3 is a block diagram illustrating an telephone 203 having an answering function in the third example. As is shown in FIG. 3, the telephone 203 includes a line controller 2, a speech network 3, a cross point switch 4, a hook switch 6, a receiving signal detector 7, a ringer 8, a DTMF signal detector 9, a termination signal detector 10, a display 16, an input section 17, a controller 18, a memory section 143, and an output section 145. The telephone 203 can further include a fax modem 150. The line controller 2, the speech network 3, the cross point switch 4, the receiving signal detector 7, the ringer 8, and the termination signal detector 10 shown in FIG. 3 correspond to the communication section 120 shown in FIG. 1.

The above-mentioned elements of the telephone 203 function in the following manner.

The receiving signal detector 7 detects a receiving signal sent from the telephone line 101 and supplies the ringer 8 and the controller 18 with a signal which indicates the detection of the receiving signal. Upon receipt of such a signal, the ringer 8 rings.

The line controller 2 is connected to and controls the path of the telephone line 101 or disconnected from the telephone line 101 in accordance with a signal from the controller 18.

The DTMF signal detector 9 detects whether or not a signal from the telephone line 101 includes a DTMF signal. If the DTMF signal is detected, the DTMF signal detector 9 sends the detected DTMF signal to the controller 18.

The termination signal detector 10 detects whether or not a signal from the telephone line 101 includes a termination signal. If the termination signal is detected, the termination signal detector 10 supplies the controller 18 with a signal which indicates such detection.

The speech network 3 routes a communication path between the telephone line 101 connected to the line controller 2 and the cross point switch 4.

The memory section 143 includes a voice data memory section 11, a message recording section 12, and a mail box memory section 13.

The voice data memory section 11 has voice data stored therein which represents a response message to be sent to the caller when the telephone 203 in the answering mode receives a telephone call.

The message recording section 12 has a plurality of areas. Voice data which represents a message from the caller is stored in either one of the areas when the DTMF signal detector 9 does not detect a predetermined DTMF signal in the answering mode.

The mail box memory section 13 also has a plurality of areas. If the DTMF signal detector 9 detects a predetermined DTMF signal while the response message is being sent out to the telephone line 101, voice data representing a message from the caller is stored in the mail box corresponding to the detected DTMF signal. Each mail box has a sub-area for storing a name thereof and an identification number necessary for reading the voice data stored therein. An example of the mail box memory section 13 is shown in FIG. 10. The DTMF signal can represent the identification number.

FIG. 4 shows exemplary messages stored in the voice data memory section 11. In the case where the telephone 203 includes the fax modem 150, at least one of the messages 1 through 9 in FIG. 4 is sent to the telephone line 101. In the case where the telephone 203 does not include the fax modem 150, at least one of the messages 1, 2, and 4 through 8 is sent to the telephone line 101.

FIG. 5 shows exemplary response messages to be sent to the caller. Which response message is to be sent to the caller depends on whether only the message recording section 12 can be used, only the fax modem 150 can be used, or both can be used.

In the case where the message recording section 12 and the fax modem 150 can both be used, message 5 "Leave your name and message at the tone." and message 3 "If you use the fax, please send now." are sent.

In the case where only the message recording section 12 can be used, message 1 "I'm sorry, I'm not available now." and message 5 "Leave your name and message at the tone." are sent.

In the case where only the fax modem 150 can be used, message 1 "I'm sorry, I'm not available now.", message 3 "If you use the fax, please send now.", message 4, "If you use the phone,", and message 2 "Please call me later." are sent.

Neither the message recording section 12 nor the fax modem 150 can be used, message 1 "I'm sorry, I'm not available now." and message 2 "Please call me later." are sent.

The message recording section 12 cannot be used, for example, when the message recording section 12 is out of order, or when all the areas of the message recording section 12 are full. The fax modem 150 cannot be used, for example, when the telephone 203 does not include the fax modem 150, when the fax modem 150 is out of order, or when the fax modem 150 is out of recording paper.

The output section 145 includes at least one of (a) a handset 5 including a speaker and a microphone and (b) a speaker amplifier 14 and a speaker 15. The handset 5 and the speaker 15 convert a voice signal from the telephone line 101 to a voice.

The hook switch 6 detects that the handset 5 is picked up when the handset 5 is not in contact with the hook switch 6.

The cross point switch 4 controls the connection among the elements connected to the cross point switch 4. For example, when the cross point switch 4 receives a signal from the speech network 3, the cross point switch 4 outputs the signal to at least one of the handset 5, the speaker amplifier 14, a voice data memory section 11, a message recording section 12, and the mail box memory section 13, based on a signal from the controller 18.

Figure 6:
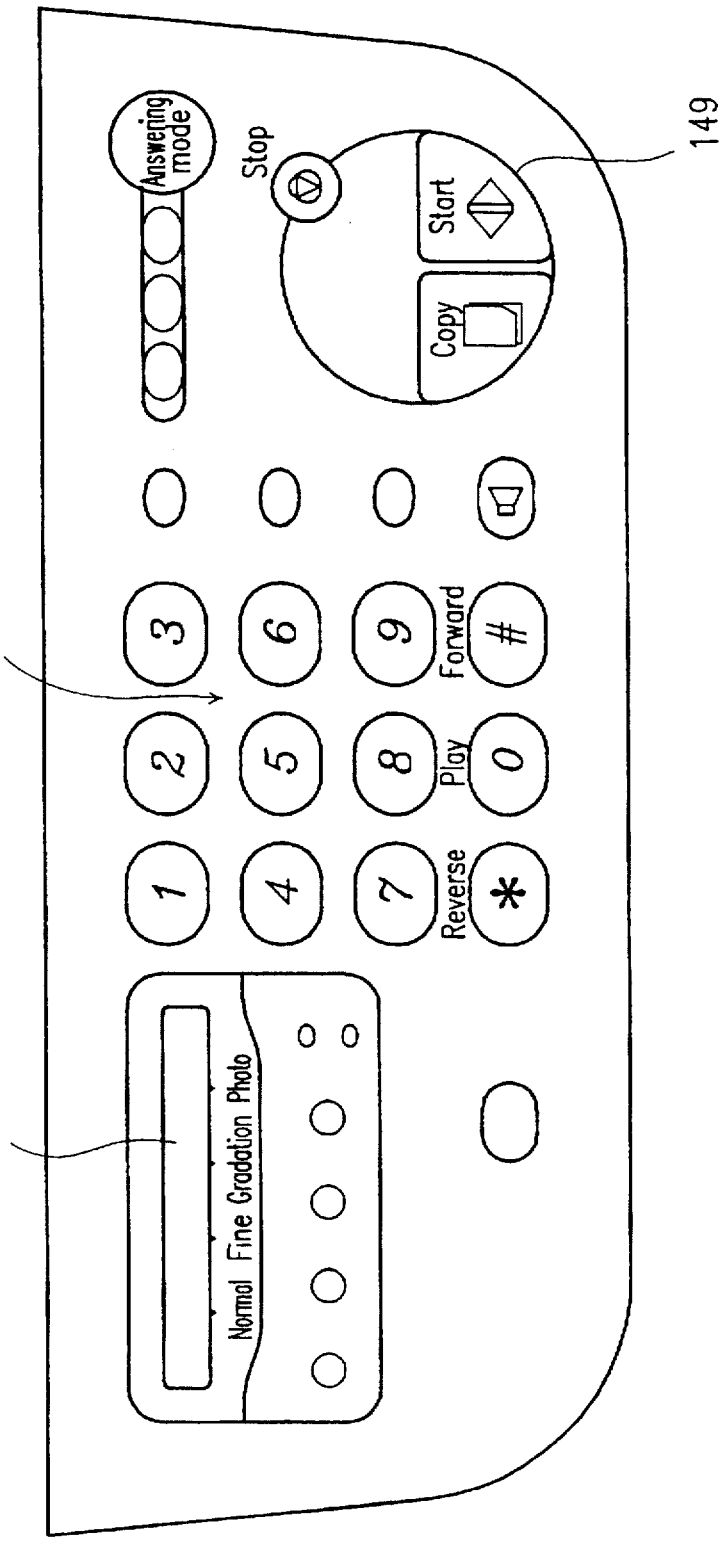
FIG. 6 is a schematic view of an input section of the telephone shown in FIG. 3.

FIG. 6 illustrates an example of the display 16 and the input section 17 in the case where the telephone 203 includes the fax modem 150.

The display 16 indicates, for example, the operating state. The input section 17 has a plurality of number keys and a plurality of function keys. The number keys are used to input the telephone numbers, the identification numbers, and the like. The functions keys have predetermined uses. For example, a start key 149 is used to output the data to be sent by the fax into the telephone line 101.

The controller 18 controls at least one of the line controller 2, the cross point switch 4, the speaker amplifier 14 and the display 16 based on the signals from at least one of the hook switch 6, the receiving signal detector 7, the DTMF signal detector 9, the termination signal detector 10, and the input section 17.

The operation of the telephone 203 will be described with reference to FIGS. 7 through 9, which are flowcharts.

Figure 7:
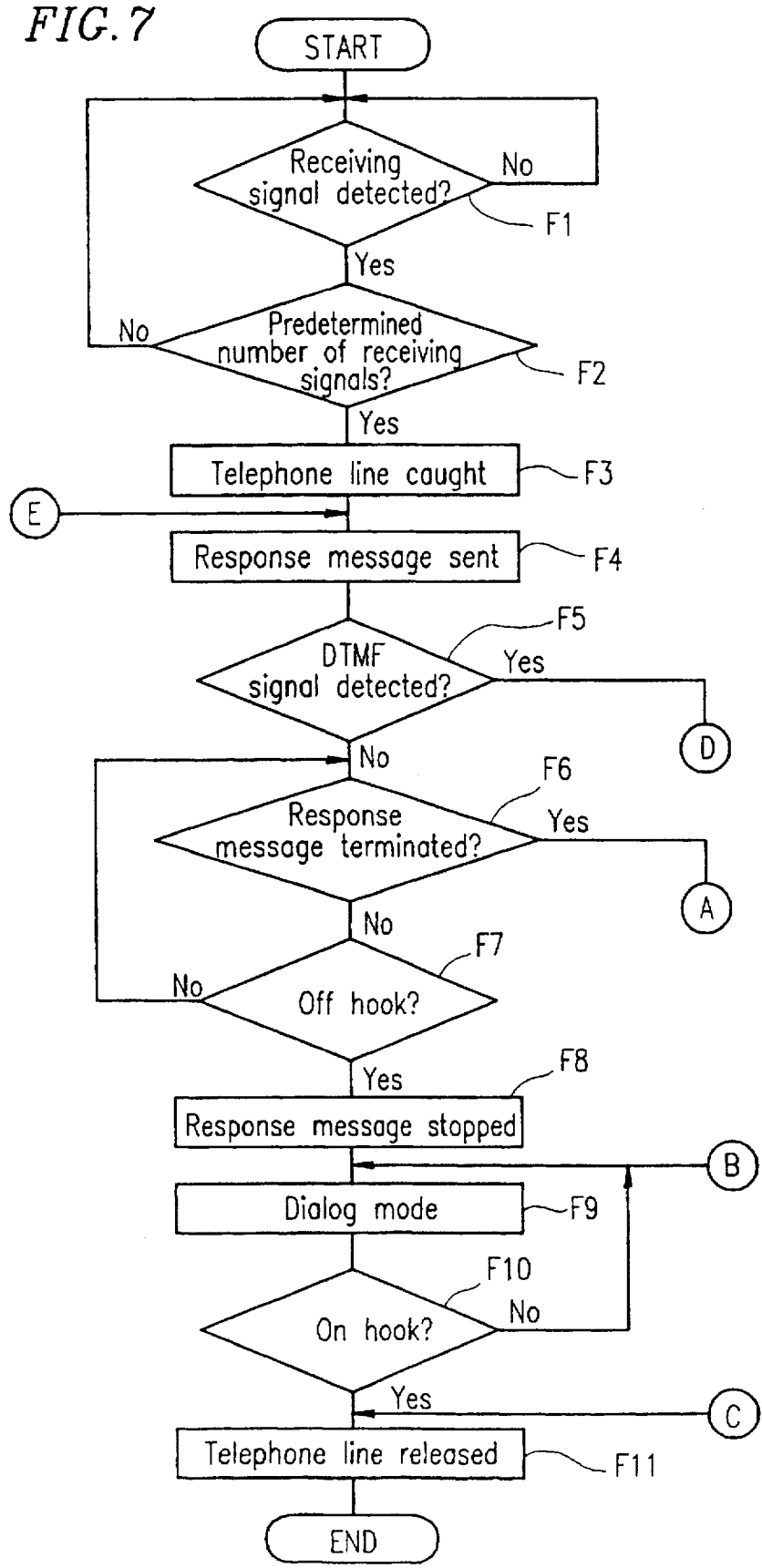
FIGS. 7, 8 and 9 are flowcharts illustrating the operation of the telephone shown in FIG. 3.

With reference to FIG. 7, at the start, the user sets the telephone 203 to the answering mode by operating the input section 17. The controller 18 clears the number of receiving signals which have been detected.

In step F1, the receiving signal detector 7 detects whether or not a signal from the telephone line 101 includes a receiving signal. If a receiving signal is detected, the ringer 8 rings in response to the receiving signal. If not, the operation of step F1 is repeated.

In step F2, the controller 18 counts the number of receiving signals which have been detected by the receiving signal detector 7 during a predetermined period of time. If the counting result is equal to or more than a predetermined value, the operation goes to step F3. If not, the controller 18 clears the counting result, and the operation goes back to step F1.

In step F3, the controller 18 controls the line controller 2 to be connected to the telephone line 101.

In step F4, the controller 18 controls the cross point switch 4 to connect the speech network 3, the voice data memory section 11, and the speaker amplifier 14 to the cross point switch 4. Then, the controller 18 controls the voice data memory section 11 to send a voice signal representing one of the response messages A through D in FIG. 5 to the telephone line 101 through the speech network 3, based on the availability of the message recording section 12 and the fax modem 150. The voice signal from the voice data memory section 11 is amplified by the speaker amplifier 14, and the speaker 15 converts the voice signal into a voice. Thus, the response message is output.

In step F5, while the response message is being sent to the telephone line 101, the DTMF signal detector 9 detects whether or not a signal from the telephone line 101 includes a DTMF signal. If a DTMF signal is detected, the operation advances to step F31 (FIG. 9). If not, the operation goes to step F6.

In step F6, the controller 18 determines whether or not the output of the response message has ended. If the output of the response message has ended, the operation goes to step F21 (FIG. 8). If the output of the response message has not ended, the operation goes to step F7.

In step F7, the hook switch 6 detects whether or not the hook switch 6 is in contact with the handset 5. If the hook switch 6 is not in contact with the handset 5, the operation goes to step F8. If the hook switch 6 is in contact with the handset 5, the operation goes back to step F6.

In step F8, the controller 18 controls the voice data memory section 11 to stop the output of the response message.

In step F9, the controller 18 controls the cross point switch 4 to connect the speech network 3 and the handset 5 to the cross point switch 4. At this point, the telephone 203 goes into a dialog mode from the answering mode. Thus, the user can directly talk to the caller through the telephone line 101.

In step F10, the hook switch 6 detects whether or not the hook switch 6 is in contact with the handset 5. If the hook switch 6 is not in contact with the handset 5, the operation goes back to step F9. If the hook switch 6 is in contact with the handset 5, the operation goes to step F11.

In step F11, the controller 18 controls the line controller 2 to release the telephone line 101. Thus, the dialog is terminated, and the telephone 203 goes into the answering mode.

As is described above, if a DTMF signal is not detected in the signal from the telephone line 101 while the response message is being sent, the operation goes to step F21 from step F6 after the response message is sent out.

Figure 8:
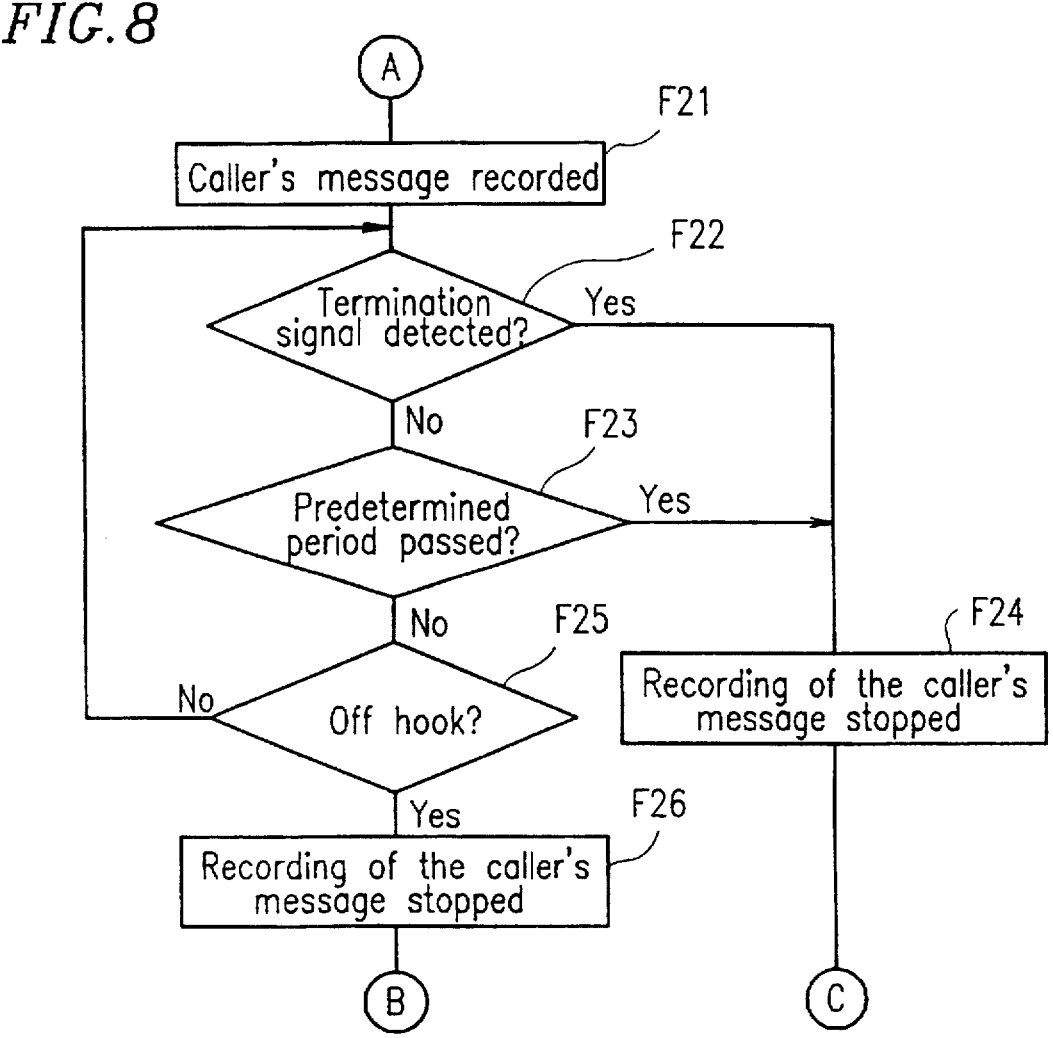

With reference to FIG. 8, in step F21, the controller 18 controls the cross point switch 4 to connect the speech network 3 and the message recording section 12 to the cross point switch 4. Then, the controller 18 controls the message recording section 12 to record a voice signal representing a message from the caller which is sent through the telephone line 101. At this point, the telephone 203 goes into a normal recording mode.

In step F22, the termination signal detector 10 detects whether or not a signal from the telephone line 101 includes a termination signal. If a termination signal is detected, the operation goes to step F24. If not, the operation goes to step F23.

In step F23, the controller 18 determines whether or not the voice signal from the telephone line 101 has been recorded for a predetermined period of time. If the voice signal has been recorded for the predetermined period of time, the operation goes to step F24. If the voice signal has not been recorded for the predetermined period of time, the operation goes to step F25.

In step F25, the hook switch 6 detects whether or not the hook switch 6 is in contact with the handset 5. If the hook switch 6 is in contact with the handset 5, the operation goes back to step F22. If the hook switch 6 is not in contact with the handset 5, the operation goes to step F26.

In step F26, the controller 18 controls the message recording section 12 to stop the recording of the voice signal. Then, the operation goes to step F9 in FIG. 7.

In step F24, the controller 18 controls the message recording section 12 to stop the recording of the voice signal from the telephone line 101. Then, the operation goes to step F11 in FIG. 7. The telephone 203 goes into the dialog mode.

As is described above regarding step F5, if a DTMF signal is detected in the signal from the telephone line 101 while the response message is being sent, the operation goes to step F31 from step F5.

Figure 9:
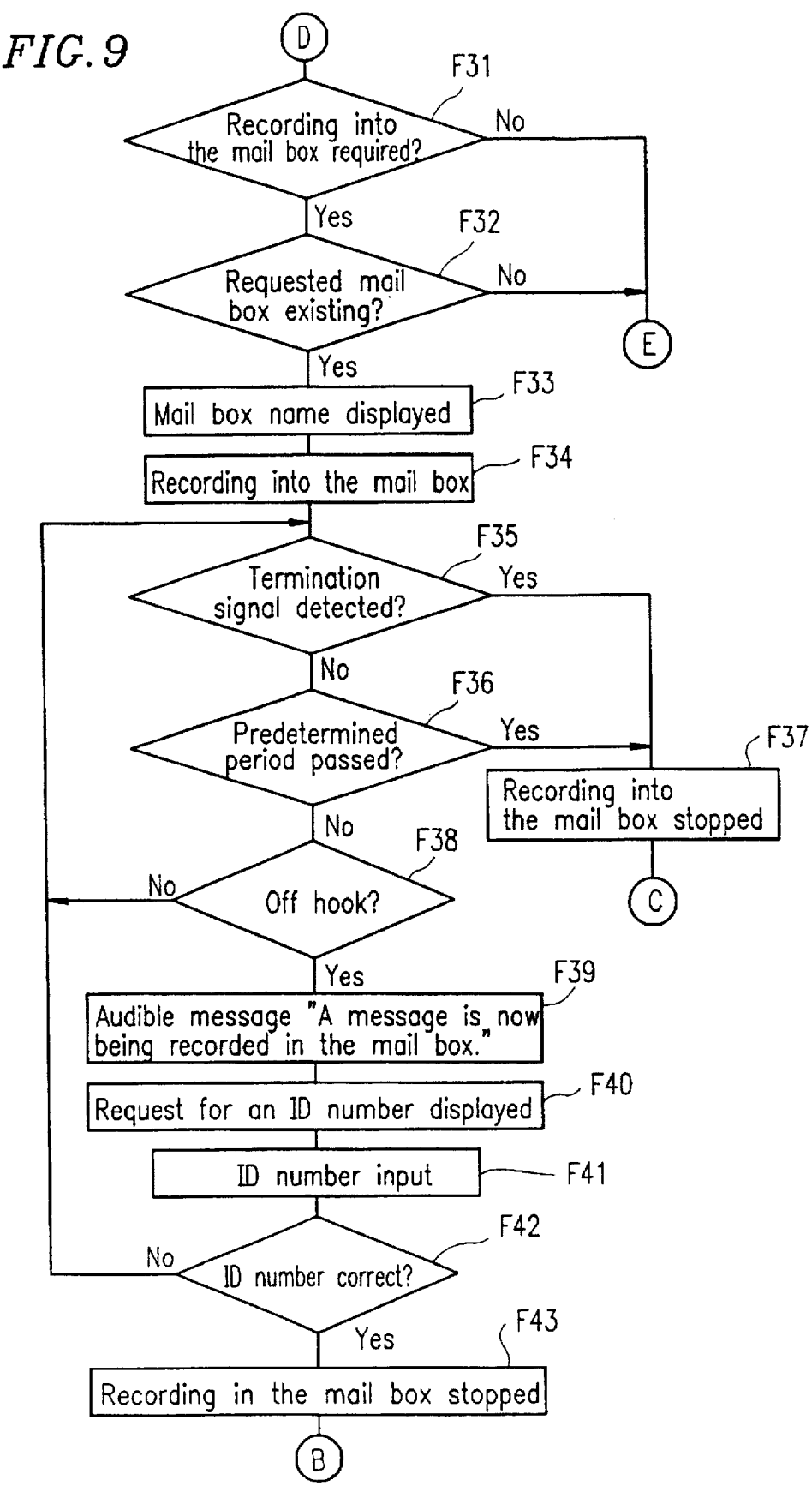

With reference to FIG. 9, in step F31, the controller 18 determines whether or not the detected DTMF signal requires that a voice signal representing a message from the caller should be recorded into a mail box. If such a voice signal should not be recorded into a mail box, the operation goes back to step F4 in FIG. 7. If such a voice signal should be recorded into a mail box, the operation goes to step F32, and the telephone 203 goes into a mail box recording mode.

In step F32, the controller 18 determines whether or not there is a mail box corresponding to the detected DTMF signal. If there is no such mail box, the operation goes back to step F4 in FIG. 7. If there is such a mail box, the operation goes to step F33.

In step F33, the controller 18 reads the name of the mail box corresponding to the DTMF signal, and the display 16 indicates information as is shown in FIG. 11.

In step F34, the controller 18 controls the cross point switch 4 to disconnect the speech network 3 and the speaker amplifier 14 from the cross point switch 4 and to connect the speech network 3 and the mail box memory section 13 to the cross point switch 4. Then, the controller 18 controls the mail box memory section 13 to record a voice signal representing the message from the caller which is sent through the telephone line 101 into the mail box corresponding to the detected DTMF signal.

In step F35, the termination signal detector 10 detects whether or not a signal from the telephone line 101 includes a termination signal. If a termination signal is detected, the operation goes to step F37. If not, the operation goes to step F36.

In step F36, the controller 18 determines whether or not the voice signal from the telephone line 101 has been recorded for a predetermined period of time. If the voice signal has been recorded for the predetermined period of time, the operation goes to step F37. If the voice signal has not been recorded for the predetermined period of time, the operation goes to step F38.

In step F38, the hook switch 6 detects whether or not the hook switch 6 is in contact with the handset 5. If the hook switch 6 is in contact with the handset 5, the operation goes back to step F35. If the hook switch 6 is not in contact with the handset 5, the operation goes to step F39.

In step F39, the controller 18 controls the cross point switch 4 to further connect the voice data memory section 11, the handset 5, and the speaker amplifier 14 to the cross point switch 4. Then, the controller 18 controls the voice data memory section 11 to send the message "A message is now being recorded in the mail box." to the speaker of the handset 5 and to the speaker 15. The speaker of the handset 5 and the speaker 15 output the message from the telephone 203. The telephone 203 can be structured so that one of the speaker of the handset 5 and the speaker 15 outputs the message.

Then, in step F40, the controller 18 controls the display 16 to indicate the request for an identification number (FIG. 12).

In step F41, the user inputs the identification number corresponding to the selected mail box through the input section 17, following an audible instruction from at least one of the speaker of the handset 5 and the speaker 15 or a visual instruction shown in the display 16.

In step F42, the controller 18 compares the identification number which is input from the input section 17 and the identification number which is stored in advance in the mail box. If the two identification numbers do not match, the operation goes back to step F35. If the two identification numbers match, the operation goes to step F43.

In step F43, the controller 18 controls the mail box memory section 13 to stop the recording of the voice signal. Then, the controller 18 controls the cross point switch 4 to connect the speech network 3 and the handset 5 to the cross point switch 4. The operation goes to step F9 in FIG. 7.

In step F37, the controller 18 controls the mail box memory section 13 to stop the recording of the voice signal.

As has been described so far, by a telephone having an answering function according to the present invention, a person who does not know the identification number is prohibited from listening to the message from the caller while the message is being recorded in a mail box.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A telephone having an answering function, comprising:
   receiving means for receiving a voice signal, a command signal, and a receiving signal from a telephone line, and providing the voice signal, the command signal, and the receiving signal as respective outputs;
   sending means for sending a response message to the telephone line in response to the receiving signal;
   storing means for storing the voice signal provided by the receiving means;
   judging means for judging whether the command signal provided by the receiving means is a predetermined command signal received during a time length of the response message sent to the telephone line and generating a judging signal which indicates that the command signal is the predetermined command signal;
   output means for converting the voice signal into an audible voice and outputting the audible voice; and
   prohibiting means for prohibiting the voice signal from being provided to the output means based on the judging signal.

2. A telephone having an answering function according to claim 1, wherein the output means is a handset, and the handset includes a speaker.

3. A telephone having an answering function according to claim 1, wherein the output means is a speaker.

4. A telephone having an answering function according to claim 1, wherein the storing means includes a plurality of storing areas, the telephone further comprising selection means for selecting a storing area to which the voice signal is to be stored from among the plurality of storing areas.

5. A telephone having an answering function according to claim 4, wherein the storing means stores the voice signal into the selected storing area.

6. A telephone having an answering function according to claim 1, further comprising notification means for outputting a prohibition notification signal which indicates at the telephone that the prohibiting means is prohibiting the voice signal from being provided to the output means.

7. A telephone having an answering function according to claim 6, further comprising input means for receiving data which is input by an operator, wherein the notification means includes memory means for storing the prohibition notification signal therein, and reading means for reading the prohibition notification signal in accordance with the data which is received by the input means from the memory means.

8. A telephone having an answering function according to claim 1, further comprising:
   input means for receiving an identification number which is input by an operator;
   identification number memory means for storing a predetermined identification number therein; and
   comparison means for comparing the identification number received by the input means and the predetermined identification number stored in the identification number memory means,
   wherein, when the identification number received by said input means and the predetermined identification number match, the prohibiting means permits the voice signal to be provided to the output means.

9. An answering machine according to claim 1, wherein the command signal is a DTMF signal.

10. A telephone having an answering function according to claim 6, wherein the notification means includes a visual display at the telephone, and the prohibition notification signal results in a visual indication on said visual display that the prohibition means is prohibiting the voice signal from being provided to the output means.

11. A telephone having an answering function according to claim 1, further comprising:
   a hook switch for a handset, said hook switch detecting whether the handset is picked up; and
   wherein said output means is a speaker on the handset, said prohibiting means prohibiting the voice signal from being provided to the speaker of the handset when the hook switch detects that the handset is picked up.

12. A telephone having an answering function according to claim 1, further comprising:

a facsimile modem; and means for detecting a current status of the facsimile modem, wherein said sending means selects at least one of a plurality of response messages and sending the selected response message to the telephone line based upon the detected current status of the facsimile modem.

13. A telephone having an answering function according to claim 12, wherein, in response to a single receiving signal, said sending means sends a plurality of the response messages to the telephone line.

* * * * *